(12) United States Patent
Iida et al.

(10) Patent No.: US 11,944,887 B2
(45) Date of Patent: Apr. 2, 2024

(54) INFORMATION PROCESSING DEVICE AND INFORMATION PROCESSING METHOD

(71) Applicant: SONY CORPORATION, Tokyo (JP)

(72) Inventors: Fumihiko Iida, Kanagawa (JP); Kentaro Ida, Tokyo (JP); Takuya Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 754 days.

(21) Appl. No.: 16/976,998

(22) PCT Filed: Jan. 29, 2019

(86) PCT No.: PCT/JP2019/002840
§ 371 (c)(1),
(2) Date: Aug. 31, 2020

(87) PCT Pub. No.: WO2019/171827
PCT Pub. Date: Sep. 12, 2019

(65) Prior Publication Data
US 2021/0004632 A1   Jan. 7, 2021

(30) Foreign Application Priority Data
Mar. 8, 2018 (JP) .................................. 2018-041393

(51) Int. Cl.
*G06K 9/00* (2022.01)
*A63B 24/00* (2006.01)
(Continued)

(52) U.S. Cl.
CPC ...... *A63B 69/0048* (2013.01); *A63B 24/0006* (2013.01); *A63B 24/0021* (2013.01);
(Continued)

(58) Field of Classification Search
CPC ............ A63B 69/0048; A63B 24/0006; A63B 24/0021; A63B 24/0087;
(Continued)

(56) References Cited

U.S. PATENT DOCUMENTS 6,069,967 A * 5/2000 Rozmus ............... G06V 10/143
348/78
9,535,538 B2 * 1/2017 Yagishita .............. G06F 3/0425
(Continued)

FOREIGN PATENT DOCUMENTS

JP    03-125905 A    5/1991
JP    09-166411 A    6/1997
(Continued)

OTHER PUBLICATIONS

International Search Report and Written Opinion of PCT Application No. PCT/JP2019/002840, dated May 7, 2019, 11 pages of ISRWO.

*Primary Examiner* — Shervin K Nakhjavan
(74) *Attorney, Agent, or Firm* — CHIP LAW GROUP

(57) ABSTRACT

Provided is an information processing device including: a control unit that performs position detection of an object, on which a light emitting unit or a reflective material is provided, on the basis of a captured image acquired by imaging of emitted light or reflected light of the object in a direction facing a side, on which the light emitting unit or the reflective material is provided, of the object, wherein the control unit adjusts algorithm for the position detection of the object according to an illuminance detection result of external light including at least a wavelength of the emitted light or the reflected light.

16 Claims, 11 Drawing Sheets

(51) Int. Cl.
*A63B 69/00* (2006.01)
*G06V 10/143* (2022.01)
*G06V 10/60* (2022.01)

(52) U.S. Cl.
CPC ........ *A63B 24/0087* (2013.01); *G06V 10/143* (2022.01); *G06V 10/60* (2022.01); *A63B 2024/0025* (2013.01); *A63B 2220/806* (2013.01)

(58) Field of Classification Search
CPC ...... A63B 2024/0025; A63B 2220/806; A63B 71/0622; A63B 2209/00; A63B 2220/10; A63B 2220/805; A63B 2225/20; A63B 2225/50; A63B 2225/74; G06V 10/143; G06V 10/60; A63F 7/0636; A63F 7/3603; A63F 2009/2444; A63F 2009/2445
See application file for complete search history.

(56) References Cited

U.S. PATENT DOCUMENTS

| | | | | |
|---|---|---|---|---|
| 9,575,597 | B2* | 2/2017 | Lin | G06V 40/28 |
| 10,025,430 | B2* | 7/2018 | Narikawa | G06F 3/03542 |
| 2005/0159231 | A1* | 7/2005 | Gobush | A63B 69/3658 |
| | | | | 473/131 |
| 2005/0168578 | A1* | 8/2005 | Gobush | A63B 69/3614 |
| | | | | 348/207.99 |
| 2006/0140485 | A1* | 6/2006 | Hing | A63F 13/812 |
| | | | | 382/103 |
| 2007/0060410 | A1* | 3/2007 | Gobush | A63B 69/3658 |
| | | | | 473/140 |
| 2008/0055266 | A1* | 3/2008 | Harada | G06F 3/0421 |
| | | | | 345/173 |
| 2010/0277412 | A1* | 11/2010 | Pryor | G06F 3/0425 |
| | | | | 345/156 |
| 2011/0033088 | A1* | 2/2011 | Rekimoto | G06F 3/0425 |
| | | | | 382/107 |
| 2011/0058109 | A1* | 3/2011 | Nishigaki | H04N 9/3147 |
| | | | | 348/744 |
| 2013/0162600 | A1* | 6/2013 | Chou | G06F 3/0421 |
| | | | | 345/175 |
| 2013/0307773 | A1* | 11/2013 | Yagishita | G06F 3/0425 |
| | | | | 345/158 |
| 2013/0314380 | A1* | 11/2013 | Kuribayashi | G06F 3/0425 |
| | | | | 345/175 |
| 2014/0111479 | A1* | 4/2014 | Krah | G06F 3/0421 |
| | | | | 345/175 |
| 2014/0267761 | A1* | 9/2014 | Fukuda | G06V 40/145 |
| | | | | 348/222.1 |
| 2014/0313166 | A1* | 10/2014 | Rattray | G06F 3/0428 |
| | | | | 345/175 |
| 2015/0362989 | A1* | 12/2015 | Tyagi | H04N 7/18 |
| | | | | 345/156 |
| 2016/0018889 | A1* | 1/2016 | Skogo | G06V 10/25 |
| | | | | 348/78 |
| 2016/0076877 | A1* | 3/2016 | Takai | G01B 11/002 |
| | | | | 356/622 |
| 2016/0139735 | A1* | 5/2016 | Lin | G06F 3/0421 |
| | | | | 345/175 |
| 2016/0196005 | A1* | 7/2016 | Kaneda | H04N 9/3197 |
| | | | | 353/20 |
| 2016/0203602 | A1* | 7/2016 | Hayashi | A61B 1/018 |
| | | | | 382/128 |
| 2016/0282968 | A1* | 9/2016 | Henninen | H04N 9/31 |
| 2016/0335492 | A1* | 11/2016 | Chern | G06V 20/653 |
| 2017/0147898 | A1* | 5/2017 | Protter | G06V 10/60 |
| 2017/0274275 | A1 | 9/2017 | Vandonkelaar | |
| 2017/0274281 | A1 | 9/2017 | Vandonkelaar | |
| 2017/0277940 | A1 | 9/2017 | Vandonkelaar | |
| 2017/0319956 | A1 | 11/2017 | Vandonkelaar | |
| 2018/0075312 | A1* | 3/2018 | Ohno | G06V 10/60 |
| 2018/0150686 | A1 | 5/2018 | Vandonkelaar | |
| 2018/0165512 | A1* | 6/2018 | Fan | G06V 40/166 |
| 2018/0239979 | A1* | 8/2018 | Ohno | G06V 40/169 |
| 2019/0182474 | A1* | 6/2019 | Chou | G06V 10/143 |
| 2020/0294256 | A1* | 9/2020 | Nakagawa | G06V 40/23 |

FOREIGN PATENT DOCUMENTS

| | | |
|---|---|---|
| JP | 11-224160 A | 8/1999 |
| JP | 11-248422 A | 9/1999 |
| JP | 2007-155370 | 6/2007 |
| JP | 2008-026236 A | 2/2008 |
| JP | 2013-195626 A | 9/2013 |
| JP | 2016-091423 A | 5/2016 |
| WO | 2016/072132 A1 | 5/2016 |
| WO | 2017/163100 A1 | 9/2017 |
| WO | 2018/002698 A1 | 1/2018 |
| WO | 2018/224870 A1 | 12/2018 |

* cited by examiner

CAPTURED IMAGE BY CAMERA C

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/002840 filed on Jan. 29, 2019, which claims priority benefit of Japanese Patent Application No. JP 2018-041393 filed in the Japan Patent Office on Mar. 8, 2018. Each of the above-referenced applications is hereby incorporated herein by reference in its entirety.

FIELD

The present disclosure relates to an information processing device, an information processing method, and a program.

BACKGROUND

Conventionally, a method of detecting a position by using emitted light that has a specific wavelength and that is, for example, infrared light has been introduced into a pen input device or the like.

For example, in Patent Literature 1 below, it is disclosed that a light reflection-type indicator that is smaller and lighter than a light pen is used in a coordinate input system that provides a coordinate input function on a transmission-type screen for an image display which screen is of a rear projection display device or the like.

CITATION LIST

Patent Literature

Patent Literature 1: JP 11-224160 A

SUMMARY

Technical Problem

However, in an environment having a detection wavelength of external light or the like, there is case where it is difficult to distinguish ambient light and a position of a detection object.

Thus, the present disclosure proposes an information processing device, an information processing method, and a program that can perform stable position detection even in an environment in which a detection wavelength is included in external light.

Solution to Problem

According to the present disclosure, an information processing device is provided that includes: a control unit that performs position detection of an object, on which a light emitting unit or a reflective material is provided, on the basis of a captured image acquired by imaging of emitted light or reflected light of the object in a direction facing a side, on which the light emitting unit or the reflective material is provided, of the object, wherein the control unit adjusts algorithm for the position detection of the object according to an illuminance detection result of external light including at least a wavelength of the emitted light or the reflected light.

According to the present disclosure, an information processing method is provided that includes: performing position detection of an object, on which a light emitting unit or a reflective material is provided, on the basis of a captured image acquired by imaging of emitted light or reflected light of the object in a direction facing a side, on which the light emitting unit or the reflective material is provided, of the object; and, adjusting algorithm for the position detection of the object according to an illuminance detection result of external light including at least a wavelength of the emitted light or the reflected light, performing position detection and adjusting algorithm being performed by a processor.

According to the present disclosure, a program is provided that causes a computer to function as a control unit that performs position detection of an object, on which a light emitting unit or a reflective material is provided, on the basis of a captured image acquired by imaging of emitted light or reflected light of the object in a direction facing a side, on which the light emitting unit or the reflective material is provided, of the object, wherein the control unit adjusts algorithm for the position detection of the object according to an illuminance detection result of external light including at least a wavelength of the emitted light or the reflected light.

Advantageous Effects of Invention

As described above, according to the present disclosure, it becomes possible to perform stable position detection even in an environment in which a detection wavelength is included in external light.

Note that the above effect is not necessarily limitative. In addition to or instead of the above effect, any of effects described in the present description or a different effect that may be grasped from the present description may be acquired.

DESCRIPTION OF EMBODIMENTS

In the following, a preferred embodiment of the present disclosure will be described in detail with reference to the attached drawings. Note that, in the present description and the drawings, the same reference signs are assigned to components having substantially identical functional configurations, and an overlapped description thereof is omitted.

Also, a description will be made in the following order.
1. Outline of information processing system according to one embodiment of the present disclosure
2. Configuration example of information processing device
3. Operation processing
4. Application example
4-1. Example of adaptation to sport climbing
4-2. Example of adaptation to home use
4-3. Other
5. Conclusion

1. OUTLINE OF INFORMATION PROCESSING SYSTEM ACCORDING TO ONE EMBODIMENT OF THE PRESENT DISCLOSURE

Figure 1:
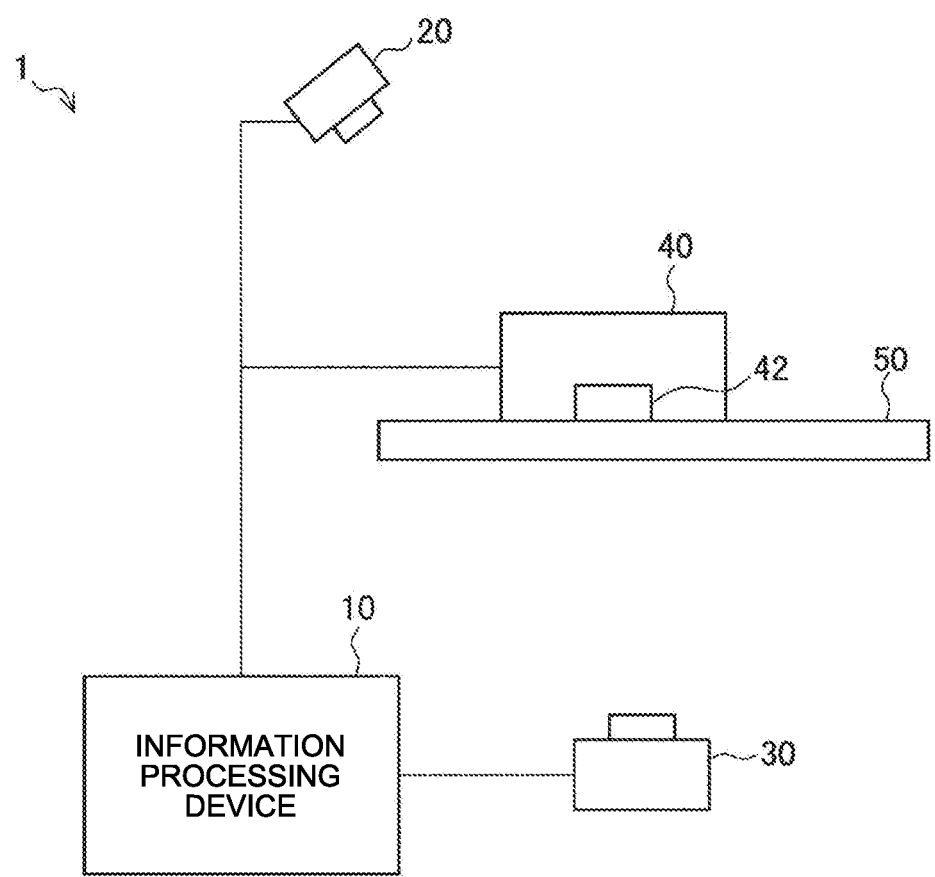
FIG. 1 is a view for describing an outline of an information processing system according to an embodiment of the present disclosure.

FIG. 1 is a view for describing an outline of an information processing system according to an embodiment of the present disclosure. As illustrated in FIG. 1, the information processing system 1 according to the present embodiment includes an external sensor 20 that measures a surrounding environment, an information processing device 10 that detects a position of an object 40 on which a light emitting element 42 is provided, and an imaging device 30 that images the object 40 from a side on which the light emitting element 42 is provided.

The information processing device 10 detects a position of the object 40 on the basis of a captured image captured by the imaging device 30.

Here, in an environment including a detection wavelength of external light or the like, there is a case where it is difficult to distinguish ambient light and a position of a detection object. That is, in a case where a method of detecting a position of an object by detecting a bright spot of a light emitting element, which is provided on the object, from a captured image acquired by imaging of the light emitting element is used, when illuminance of external light having an emission wavelength (detection wavelength) of the light emitting element is high, the illuminance of the external light in the surrounding is detected sufficiently higher than illuminance of the bright spot, and it is difficult to detect the bright spot or to determine the position of the detection object.

Thus, as illustrated in FIG. 1, in the present embodiment, the light emitting element 42 is provided on a part of a bottom surface (preferably, position not grounded on an outline of the bottom surface) of the object 40, the imaging device 30 is arranged in such a manner that imaging is performed from a lower side through a plate-like member 50 on which the object 40 is placed, that is, in a direction facing the bottom surface on which the light emitting element 42 is provided, and a captured image is acquired. Then, a position of the object 40 is detected from the captured image. Here, the information processing device 10 makes it possible to perform stable position detection even in an environment in which a detection wavelength is included in external light by adjusting algorithm used in detection of a position of the object 40 according to an external light environment detected by the external sensor 20.

Note that the object 40 illustrated in FIG. 1 may be fixed, or a position thereof may be changed by a user or an independent operation. The light emitting element 42 provided on the object 40 is to emit light of a specific wavelength, and may be what emits light by itself, such as an LED or organic EL, or may be a reflective material that reflects a different light source and that is, for example, a recursive material or a mirror including fine particles or prisms. Also, there may be one or a plurality of light emitting elements 42 on the object 40. Also, the light emitting element 42 may be arranged by combination of elements having different light emitting properties. A housing that forms the object 40 may be for fixation of a light emitting element or for a different function.

The external sensor 20 is used to grasp a surrounding environment of the object 40 and the imaging device 30, specifically, an illuminance environment that affects detection of the object 40. The external sensor 20 is realized by a camera that acquires an image at a specific wavelength, or an illuminance sensor. One or a plurality of wavelengths may be acquired. Also, there may be one or a plurality of external sensors 20. Note that the imaging device 30 may also have a function of the external sensor 20.

The plate-like member 50 on which the object 40 is placed is a member that transmits the emission wavelength of the light emitting element 42. Also, the plate-like member 50 is placed between the object 40 and the imaging device 30.

As described above, the information processing device 10 detects the position of the object 40 on the basis of the captured image from the imaging device 30. Specifically, the information processing device 10 may adjust algorithm used for position detection on the basis of a detection result from the external sensor 20. More specifically, the information processing device 10 switches position detection algorithm to be used or changes a parameter used in position detection algorithm to be used, for example, according to an external light illuminance environment with respect to light emission intensity of the light emitting element 42.

In the above, an information processing system according to one embodiment of the present disclosure has been described. Next, a configuration and operation processing of the information processing system according to the present embodiment will be described in detail. In the present embodiment, an example of adaptation to air hockey will be described as an example.

Figure 2:
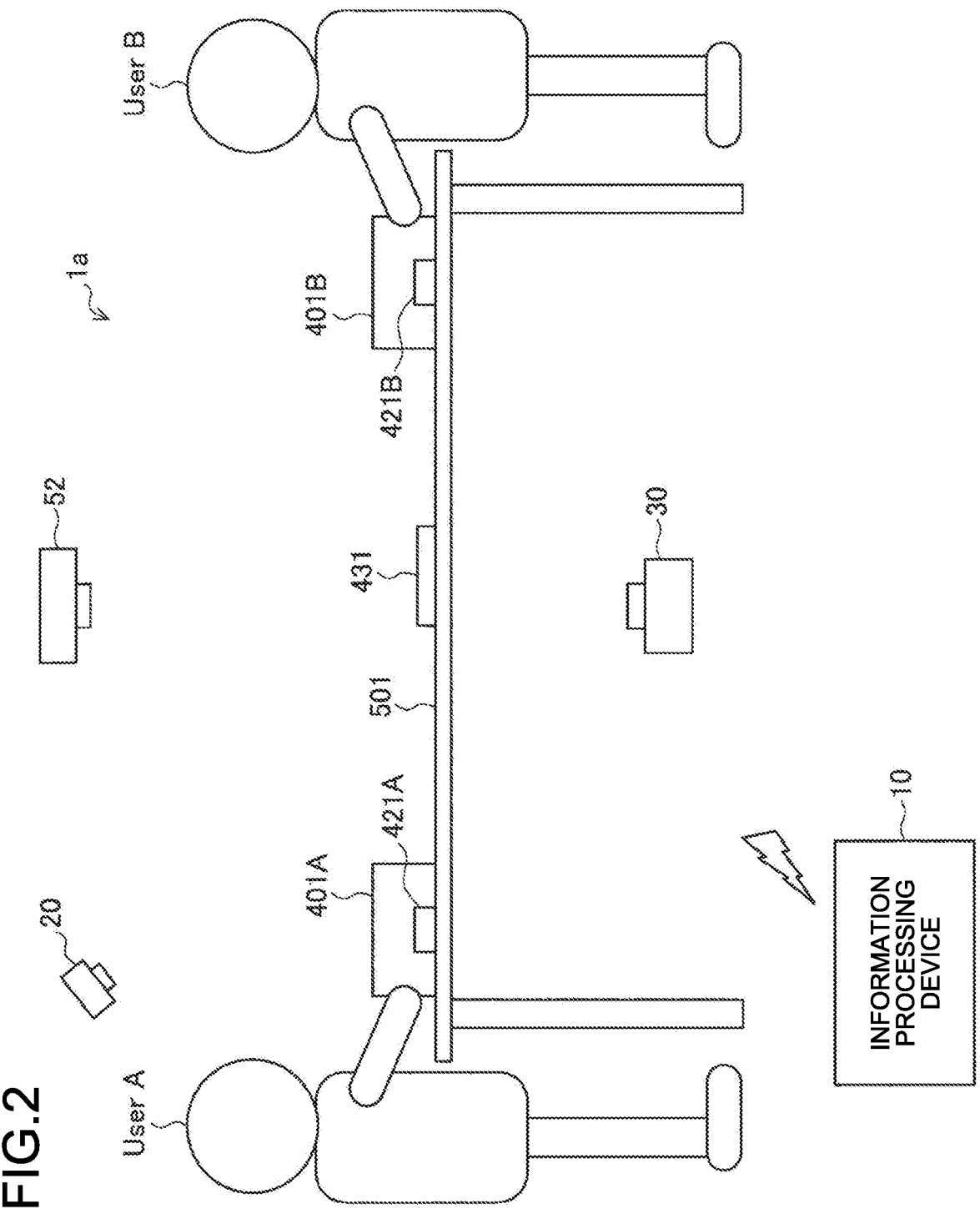
FIG. 2 is a view for describing an arrangement configuration of a case where the information processing system according to the present disclosure is adopted to air hockey.

FIG. 2 is a view for describing an arrangement configuration of a case where the information processing system 1 according to the present disclosure is adopted to air hockey. The air hockey is a game in which a user grips a tool called a mallet (hereinafter, mallet 401) and hits a disk that is made of plastic or the like and is called a puck (hereinafter, puck 431) on a board, the puck 431 being levitated by the air blasted onto a board surface. As illustrated in FIG. 2, in a case where a plurality of users plays a match, the users (user A and user B) respectively grip and operate a mallet 401A and a mallet 401B, and hit the puck 431.

Also, in the present embodiment, a mallet 401 gripped by each user corresponds to the object 40, and a light emitting element 421 is installed on a bottom surface part of the mallet 401, as illustrated in FIG. 2. In the present embodiment, for example, an infrared (IR) LED is used as the light emitting element 421. Here, a board surface 501 includes a material that does not transmit a visible light region and that transmits an IR (such as white polymethyl methacrylate (PMMA) or cloth). This makes it possible to prevent the user from visually recognizing installation jigs such as a detection camera (imaging device 30) and to prevent a damage in an appearance of an air hockey game device. Also, since the board surface 501 does not transmit visible light, it becomes possible to project a video or the like on the board surface 501 by a projector 52. The information processing device 10 can arbitrarily project a video or the like on the board surface 501 by the projector 52 according to positional information of the mallet 401 detected by the present system.

Also, on a lower side of the board surface 501 on which the mallet 401 is placed, an angle of view of the imaging device 30 installed in such a manner as to face the board surface 501 is preferably an angle of view with which the entire board surface 501 can be photographed. Also, in the imaging device 30, a photographing wavelength may be limited by a bandpass filter or the like that detects only an emission wavelength of the light emitting element 421.

Next, a detailed configuration of the information processing device 10 according to the present embodiment will be described.

2. CONFIGURATION EXAMPLE OF INFORMATION PROCESSING DEVICE 10

Figure 3:
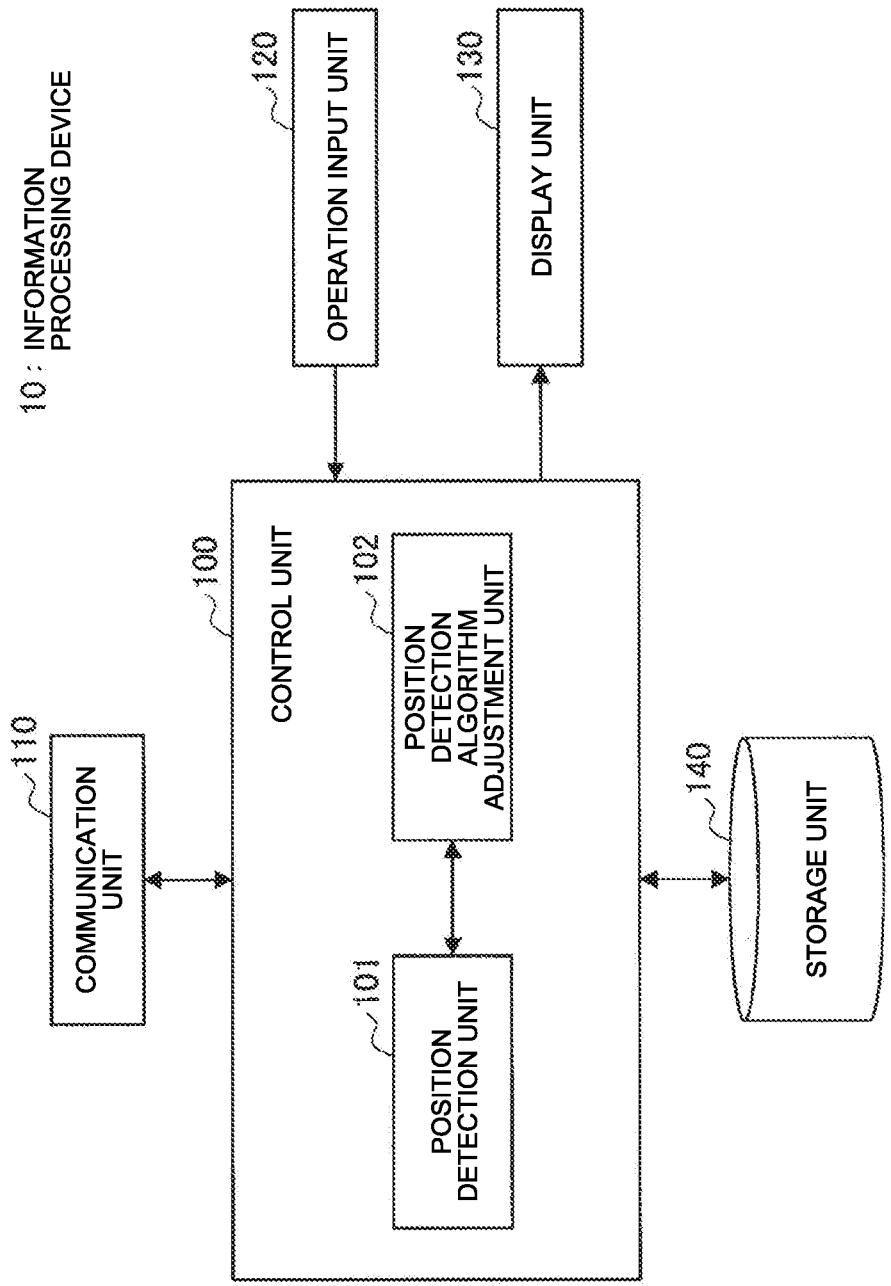
FIG. 3 is a block diagram illustrating an example of a configuration of an information processing device according to the present embodiment.

FIG. 3 is a block diagram illustrating an example of a configuration of the information processing device 10 according to the present embodiment. As illustrated in FIG. 3, the information processing device 10 includes a control unit 100, a communication unit 110, an operation input unit 120, a display unit 130, and a storage unit 140.

The control unit 100 functions as an arithmetic processing device and a control device, and controls overall operation in the information processing device 10 according to various kinds of programs. The control unit 100 is realized by an electronic circuit such as a central processing unit (CPU) or a microprocessor, for example. Also, the control unit 100 may include a read only memory (ROM) that stores a program, a calculation parameter, or the like to be used, and a random access memory (RAM) that temporarily stores a parameter or the like that changes as appropriate.

Also, the control unit 100 according to the present embodiment also functions as a position detection unit 101 and a position detection algorithm adjustment unit 102.

On the basis of the captured image acquired by the imaging device 30, the position detection unit 101 detects a position of the mallet 401 by using position detection algorithm adjusted by the position detection algorithm adjustment unit 102.

The position detection algorithm adjustment unit 102 adjusts the position detection algorithm on the basis of an external light illuminance detection result from the external sensor 20. As for the adjustment of the position detection algorithm, switching of a plurality of kinds of position detection algorithm and changing a parameter in the position detection algorithm are assumed.

Here, switching of a plurality of kinds of position detection algorithm according to the external light illuminance detection result will be described.

First, algorithm used in a case where external light illuminance is sufficiently lower than luminance (illuminance) of the light emitting element 421 will be described as first position detection algorithm.

In the present embodiment, the "external light illuminance" means illuminance of a wavelength (being detection wavelength and corresponding to an emission wavelength of the light emitting element 421) detected by the imaging device 30. For example, a case where there is no light, a case where lights do not include infrared rays, and the like are assumed as examples of a case where the external light illuminance is sufficiently low. In this case, since the external light illuminance is sufficiently low, a bright spot of an IR LED (light emitting element 421) has the highest luminance in the captured image acquired by the imaging device 30.

The position detection algorithm adjustment unit 102 may determine that the external light illuminance is sufficiently low in a case where the external light illuminance is lower than a predetermined threshold set according to the luminance of the light emitting element 421, for example.

Figure 4:
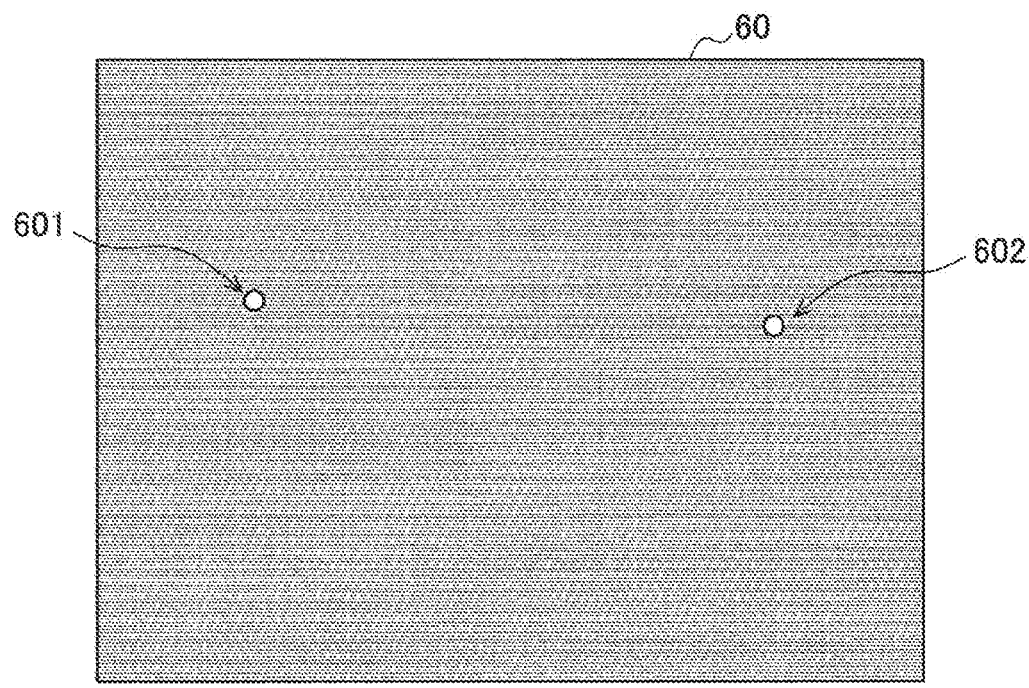
FIG. 4 is a view for describing an example of position detection algorithm based on a bright spot according to the present embodiment.

In this case, for example, as illustrated in FIG. 4, the captured image acquired by the imaging device 30 becomes a captured image 60 from which bright spots 601 and 602 respectively corresponding to the mallets 401A and 401B can be detected. Thus, the position detection unit 101 can detect the bright spots 601 and 602 having high luminance and can calculate positions of the mallets 401A and 401B according to positions of the detected bright spots.

Note that the detection of an illuminance environment is not limited to be by the external sensor 20, and determination can be also made from the captured image acquired by the imaging device 30 (that is, the imaging device 30 also functions as the external sensor 20). For example, in a case where a bright spot having a predetermined size can be detected from the captured image acquired by the imaging device 30 (it is assumed that a size of a bright spot corresponding to the light emitting element 421 is already known), the position detection algorithm adjustment unit 102 determines that the external light illuminance is sufficiently lower than the luminance (illuminance) of the light emitting element 421, and selects the first position detection algorithm.

Next, algorithm used in a case where external light illuminance is higher than luminance (illuminance) of the light emitting element 421 will be described as a second position detection algorithm.

As an example of a case where the external light illuminance is higher than the luminance of the light emitting element 421, for example, a case of an environment in which sunlight is directly radiated or a lighting environment of a mercury lamp or the like in which environment infrared rays are generated is assumed. In this case, since the external light illuminance is sufficiently high, the illuminance due to the external light is detected sufficiently higher than the illuminance of the bright spot of the IR LED (light emitting element 421) in the captured image acquired by the imaging device 30, and bright spot detection cannot be performed by the first algorithm. Note that the position detection algorithm adjustment unit 102 may determine that the external light illuminance is higher than the luminance of the light emitting element 421, for example, in a case where the external light illuminance exceeds a predetermined threshold set according to the luminance of the light emitting element 421.

Figure 5:
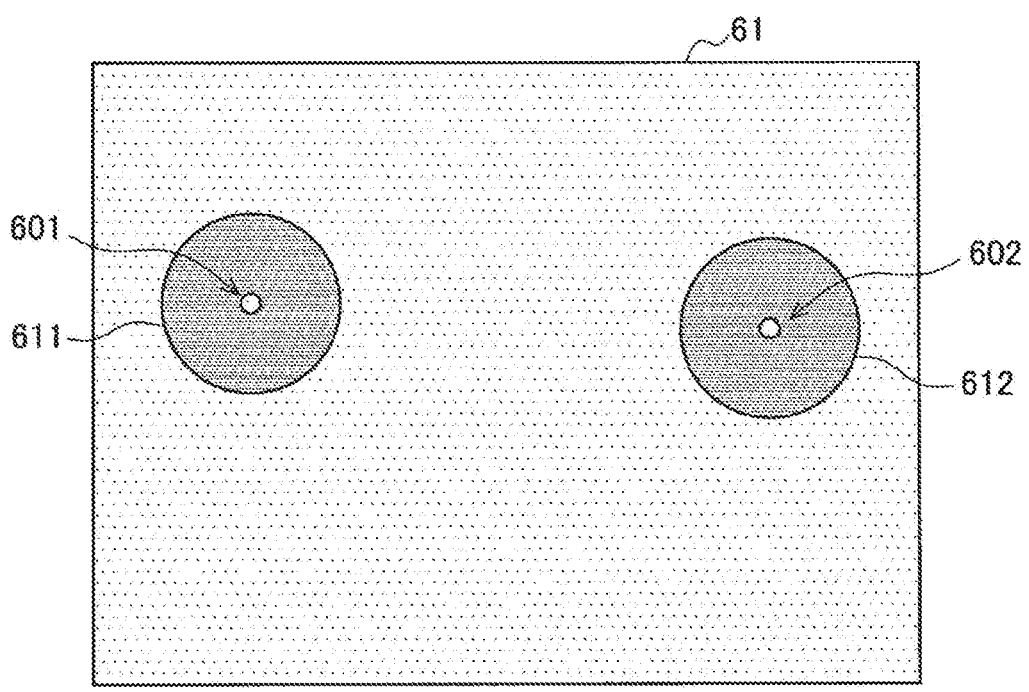
FIG. 5 is a view for describing an example of position detection algorithm based on a positional relationship between a shadow and a bright spot according to the present embodiment.

In this case, the position detection algorithm adjustment unit 102 selects, as second position detection algorithm, a means of determining a position of a mallet 401 (object) by combining an area having low luminance (part shaded by the mallet 401) and a position having high luminance therein (bright spot) on the basis of luminance information acquired from the captured image. Specifically, for example, as illustrated in FIG. 5, in a case where a positional relationship that bright spots 601 and 602 are placed in shadow regions 611 and 612 is acquired in the captured image 61, it is determined that the bright spots 601 and 602 correspond to the mallets 401A and 401B and it becomes possible to perform position calculation of the mallets 401A and 401B. Also, a position of a shadow region having a shape of a mallet 401 may be detected and the position may be directly output as a position of the mallet 401. The captured image 61 having a shadow of such a mallet 401 is acquired when the imaging device 30 images the mallet 401 in a direction facing a surface on which the light emitting element 421 is provided.

In the above, a plurality of kinds of position detection algorithm and selection thereof have been described.

Figure 6:
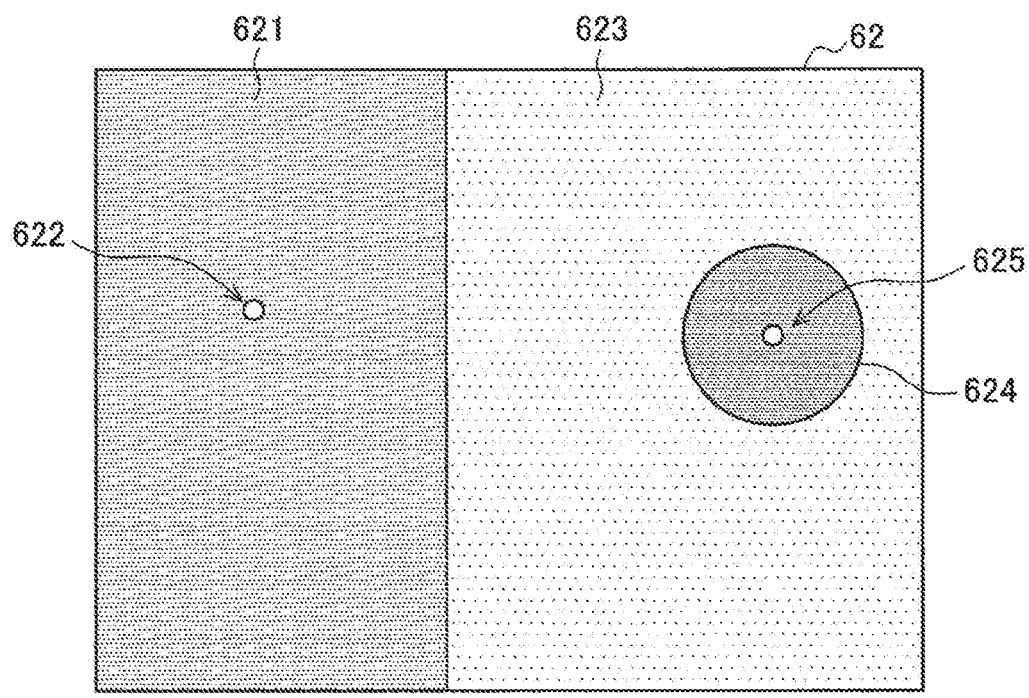
FIG. 6 is a view for describing a case where different kinds of position detection algorithm are respectively used for regions according to the present embodiment.

Note that a case where external light illuminance is not uniform in an area (in detection range by the imaging device 30) is also assumed. For example, a case where external light does not reach a part of the region due to eaves or the like can be considered. Thus, on the basis of the luminance information of the captured image, the position detection algorithm adjustment unit 102 may respectively select different kinds of position detection algorithm for regions having different luminance in the captured image acquired by the imaging device 30. For example, as illustrated in FIG. 6, in a case where a first region 621 having luminance lower than a predetermined value and a second region 623 having luminance higher than the predetermined value are detected from the captured image 62, the position detection algorithm adjustment unit 102 may set to use the first position detection algorithm for the first region 621 since a position thereof can be detected only on the basis of the bright spot 622, and to use the second position detection algorithm for the second region 623 since a position thereof can be detected on the basis of a positional relationship between a shadow region 624 and a bright spot 625. In such a manner, position detection algorithms can be selected for each area according to an illuminance condition in the present embodiment.

Furthermore, as an adjustment of position detection algorithm according to an external light illuminance detection result, the position detection algorithm adjustment unit 102 according to the present embodiment can change a parameter of predetermined position detection algorithm.

For example, in a situation in which the second position detection algorithm is constantly used, the position detection algorithm adjustment unit 102 may multiply a shadow position parameter used in the algorithm by a weight coefficient corresponding to illuminance. As a result, for example, when the illuminance is 0, a parameter of a shadow position which parameter is multiplied by the illuminance also becomes 0, and detection is based only on a bright spot position eventually. Also, as described above, in a case where external light illuminance is not uniform in an area, regions having different luminance may be set on the basis of luminance information of a captured image, and different parameters may be respectively applied to regions in the captured image acquired by the imaging device 30.

In the above, each function of the information processing device 10 has been described. Note that the information processing device 10 may perform control in such a manner as to generate a projection control signal to control projection of a predetermined video on the plate-like member 50 on the basis of positional information of the mallet 401 detected by the position detection unit 101, and to transmit the signal to the projector 52 through the communication unit 110.

(Communication Unit 110)

The communication unit 110 transmits and receives information to and from other devices. For example, the communication unit 110 receives a detection result of external light illuminance from the external sensor 20, or receives captured image from the imaging device 30. Also, the communication unit 110 can transmit positional information detected by the position detection unit 101 or a projection control signal corresponding to the positional information to the projector 52.

The communication unit 110 is communicatively connected to another device through, for example, a wired/wireless local area network (LAN), Wi-Fi (registered trademark), Bluetooth (registered trademark), near field communication, a mobile communication network (long term evolution (LTE)), or 3rd generation mobile communication system (3G)).

(Operation Input Unit 120)

The operation input unit 120 receives an operating instruction from a user and outputs the operation content to the control unit 100. The operation input unit 120 may be a touch sensor, a pressure sensor, or a proximity sensor. Alternatively, the operation input unit 120 may be a physical component such as a keyboard, a mouse, a button, a switch, and a lever.

(Display Unit 130)

The display unit 130 is a display device that outputs various display screens. For example, the display unit 130 may display perceptual position information (including migration pathway) or a generated tactile presentation signal. This display unit 130 may be a display device such as a liquid-crystal display (LCD) or an organic electro luminescence (EL) display, for example.

(Storage Unit 140)

The storage unit 140 is realized by a read only memory (ROM) that stores a program, a calculation parameter, and the like to be used in processing by the control unit 100, and a random access memory (RAM) that temporarily stores a parameter or the like that changes as appropriate.

In the above, a configuration of the information processing device 10 according to the present embodiment has been described in detail. Note that the configuration of the information processing device 10 is not limited to the example illustrated in FIG. 3. For example, the information processing device 10 may include a plurality of devices. Also, the information processing device 10 may further include a sound input unit and a sound output unit.

Also, the information processing device 10 may be realized by a PC, a smartphone, a mobile phone terminal, a tablet terminal, a dedicated terminal, or the like. In addition, at least a portion of the control unit 100 of the information processing device 10 may be realized by a server on a network.

3. OPERATION PROCESSING

Figure 7:
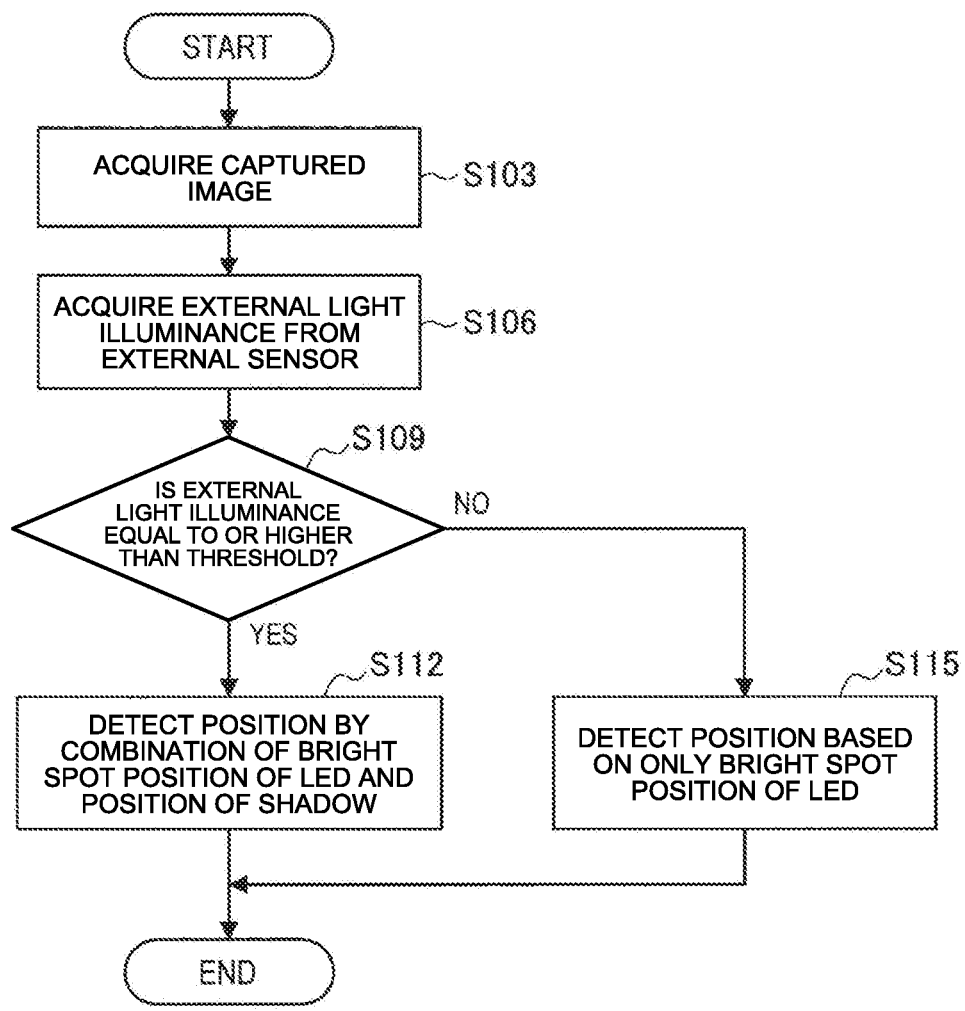
FIG. 7 is a flowchart illustrating an example of a flow of position detection processing according to the present embodiment.

Next, operation processing of the information processing system according to the present embodiment will be described in detail with reference to FIG. 7. FIG. 7 is a flowchart illustrating an example of a flow of position detection processing according to the present embodiment.

As illustrated in FIG. 7, first, the information processing device 10 acquires a captured image from the imaging device 30 (Step S103).

Then, the information processing device 10 acquires external light illuminance from the external sensor 20 (Step S106).

Then, the position detection algorithm adjustment unit 102 determines whether the external light illuminance is equal to or higher than a threshold (Step S109).

Then, in a case where the external light illuminance is equal to or higher than the threshold (Step S109/Yes), the information processing device 10 causes the position detection algorithm adjustment unit 102 to select position detection algorithm based on a combination (positional relationship) of a bright spot position of the LED (light emitting element 421) and a shadow position, and causes the position detection unit 101 to detect a position of the mallet 401 by using the selected position detection algorithm (Step S112).

On the other hand, in a case where the external light illuminance is not equal to or higher than the threshold (Step S109/No), the information processing device 10 causes the position detection algorithm adjustment unit 102 to select position detection algorithm based only on a bright spot position of the LED (light emitting element 421), and causes the position detection unit 101 to detect a position of the mallet 401 by using the selected position detection algorithm (Step S115).

In the above, an example of the operation processing according to the present embodiment has been described. Note that the operation processing illustrated in FIG. 7 is an example, and the present disclosure is not limited to the example illustrated in FIG. 7. For example, the present disclosure is not limited to the order of the steps illustrated in FIG. 7. At least some of the steps may be processed in parallel, or may be processed in reverse order. For example, the processing in Step S103 and the processing in Step S106 may be processed in parallel or in reverse order.

(Supplementary Notes)

In Step S109 described above, external light illuminance and a threshold are compared with each other. However, such processing is mainly for evaluating a relationship between the external light illuminance and illuminance of the light emitting element 421. Here, as different evaluation methods (determination criteria for selecting position detection algorithm), the following examples are also included.

Comparison between an estimated value and detected external light illuminance, the estimated value being derived from a current applied to the light emitting element 421 or a light emitting property thereof Evaluation of detected external light illuminance on the basis of illuminance information of the light emitting element 421 which information is acquired at initial setting Also, in a case where the imaging device 30 also has a function of the external sensor 20, the position detection algorithm adjustment unit 102 may determine that the threshold is met or exceeded (external light illuminance is higher than the threshold) (that is, select the second position detection algorithm) in a case where an observation area with high luminance is larger, in a captured image, than a size corresponding to the light emitting element 42. Also, the position detection algorithm adjustment unit 102 may determine that the threshold is met or exceeded (external light illuminance is higher than the threshold) (that is, select the second position detection algorithm) in a case where a shadow region can be detected from a captured image on the basis of luminance information acquired from the captured image.

Also, in a case where a different lighting device such as an IR projector is provided outside, a shadow of the mallet 401 may be further emphasized by interlocking with the lighting device.

In addition, in a case where a material of a housing (mallet 401) to which the IR LED (light emitting element 421) is attached is a material that transmits a detection wavelength, it is assumed that no shadow is generated by the housing. Thus, a component having a material that does not transmit the detection wavelength may be attached in the housing. Alternatively, it is possible to perform position detection by performing photographing by the imaging device 30 in a wavelength body that does not pass through the housing, and combining data of a shadow acquired from a captured image and a photographing wavelength (corresponding to bright spot position) at a detection wavelength (of the light emitting element 421).

4. APPLICATION EXAMPLE

An example of applying the information processing system 1 according to the present embodiment to air hockey (information processing system 1a) has been described above. However, the present embodiment is not limited to this, and the following application examples are also possible, for example.

(4-1. Example of Adaptation to Sport Climbing)

Figure 8:
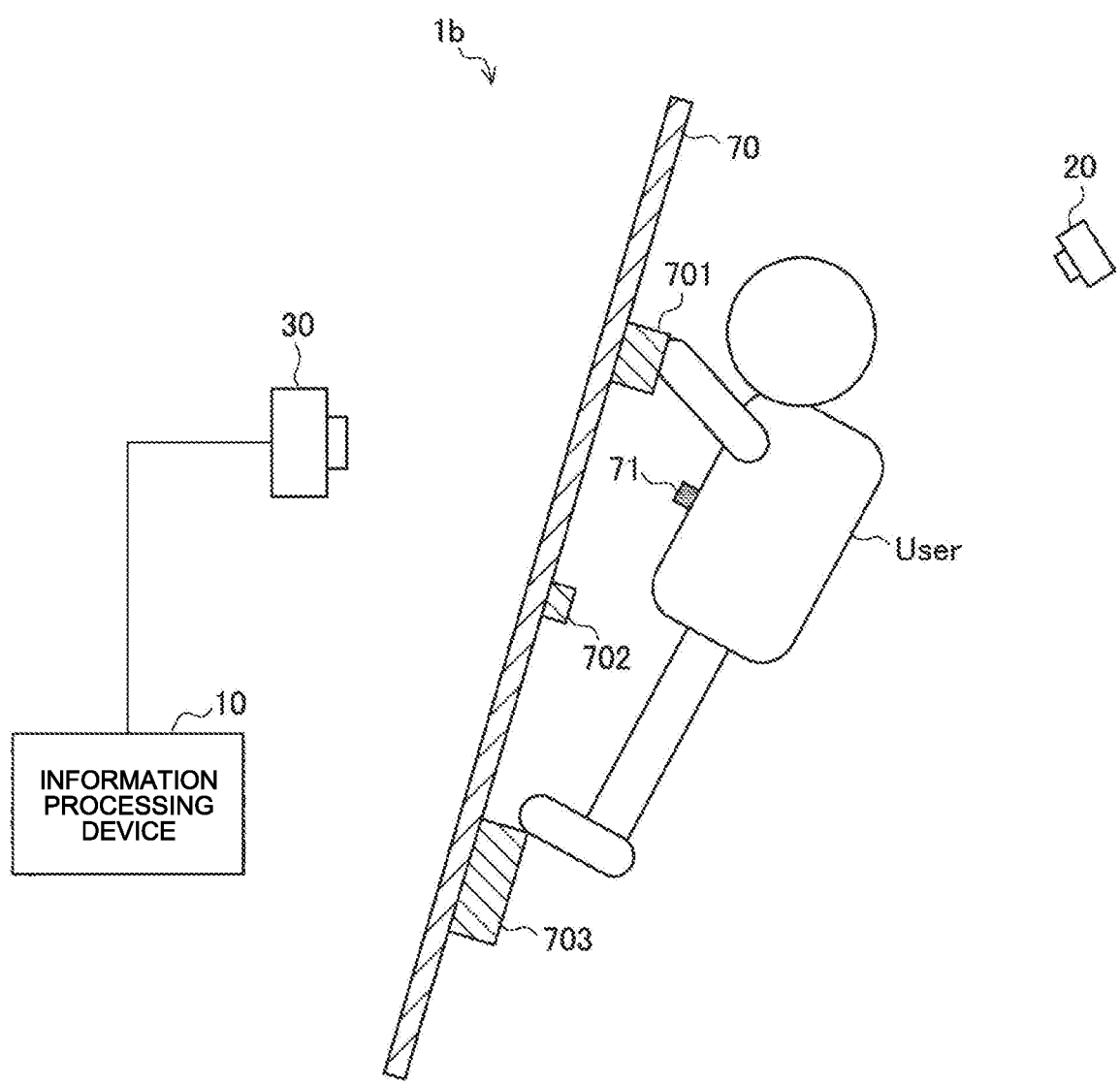
FIG. 8 is a view for describing an example of applying the information processing system according to the present embodiment is applied to sport climbing.

FIG. 8 is a view for describing an example of applying the information processing system 1 according to the present embodiment to sport climbing (information processing system 1b).

As illustrated in FIG. 8, sport climbing is a game in which a player grabs a protrusion (holds 701 to 703) attached to a wall 70 called a wall and climbs. The information processing system 1b detects a position of a user (player) on the wall 70.

Specifically, a light emitting element 71 is attached to the user and used to detect limbs and the like of the user. One or more light emitting elements 71 may be attached to a body of the user.

Also, the wall 70 has a property of transmitting a wavelength of the light emitting element 71. Also, the wall 70 may be a porous material.

The imaging device 30 performs imaging from a back side of the wall 70 on which the user climbs, that is, in a direction facing the user through the wall 70. Here, the body of the user corresponds to a housing of the mallet 401 in the information processing system 1a, and a bright spot corresponding to the light emitting element 71 attached to the body of the user is placed in a shadow of the user in a case where the shadow of the user can be extracted from a captured image.

The position detection algorithm adjustment unit 102 selects the first position detection algorithm for performing position detection on the basis of only the bright spot of the light emitting element 71 in a case where external light illuminance is sufficiently low (for example, in a case of being lower than a predetermined threshold), and selects the second position detection algorithm for combining a shadow of the user and a bright spot position of the light emitting element in a case where the external light illuminance is higher than the predetermined threshold.

Also, in a case where a skeletal frame of the user can be estimated from shadow information of the user, the position detection unit 101 can also individually identify the user according to an attachment position of the light emitting element 71 to the user.

Also, when the user is walking on a floor that transmits a wavelength of the light emitting element, it is possible to provide a light emitting element on a sole of a foot or a sole of a shoe and to perform position detection of a person by detection from a back side.

(4-2. Example of Adaptation to Home Use)

Next, an example of adaptation to a living environment will be described with reference to FIG. 9 to FIG. 12.

Figure 9:
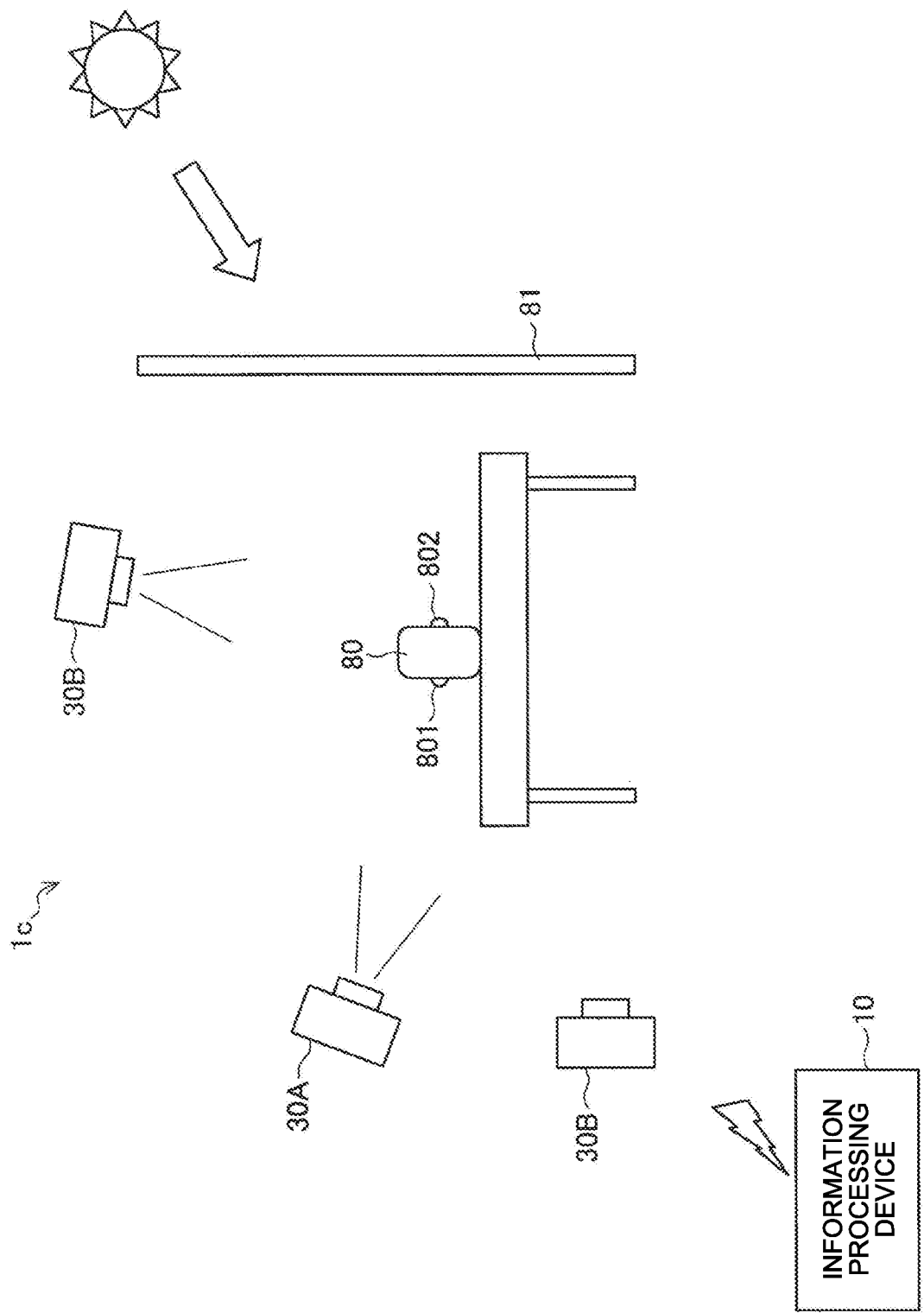
FIG. 9 is a view for describing an example of applying the information processing system according to the present embodiment to a living environment.

FIG. 9 is a view for describing an example of applying the information processing system 1 according to the present embodiment to a living environment (information processing system 1c).

In the example illustrated in FIG. 9, in a living environment, a plurality of detection cameras (imaging devices 30A to 30C) is installed in order to detect an object 80 (object or person) on which a plurality of IR LEDs (light emitting elements 801 and 802) are mounted. It is preferable to use a plurality of detection cameras since it is assumed that the living environment is likely to have many blind spots compared to the above-described examples of air hockey and sport climbing. Also, since photographing is performed from multiple directions by the plurality of detection cameras, it is preferable that a plurality of IR LEDs (light emitting elements) is mounted on the object 80.

Note that unlike the examples described above, each of the imaging devices 30A to 30C performs imaging in a direction facing the object 80 without a member or the like placed therebetween in the present embodiment.

Figure 10:
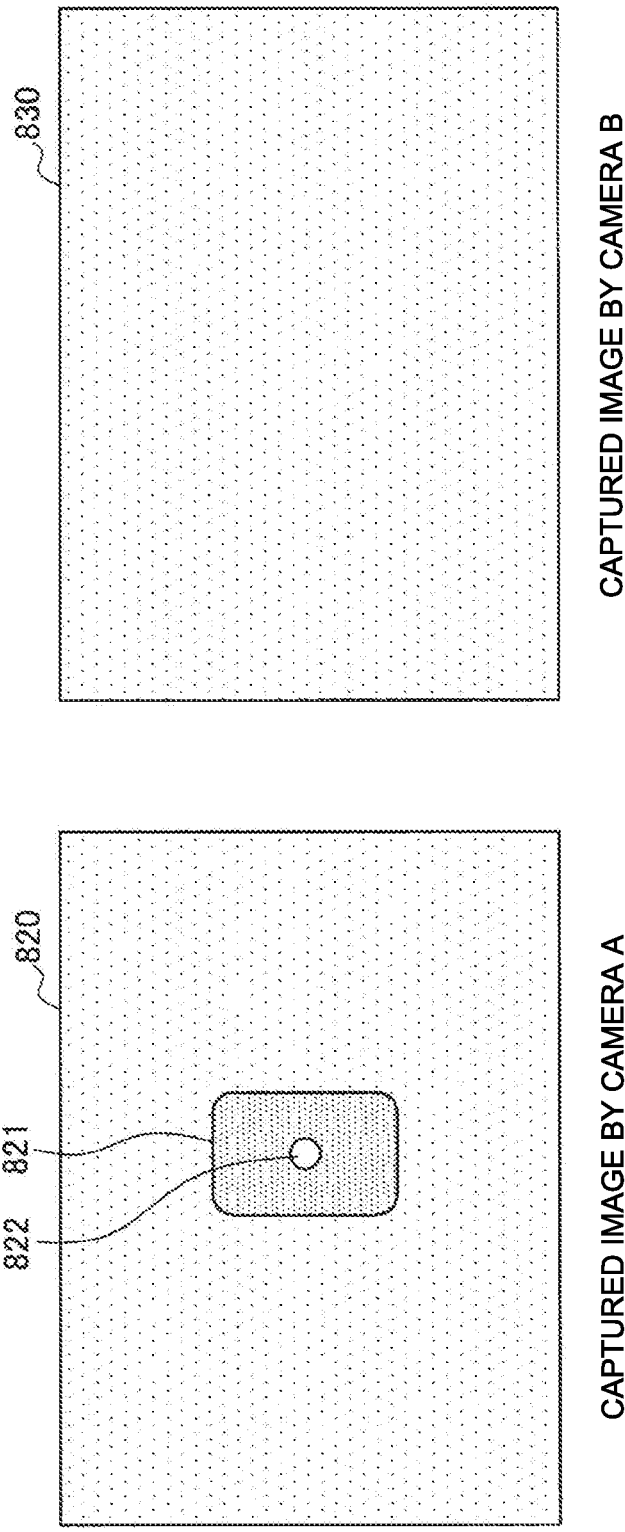
FIG. 10 is a view illustrating an example of a captured image acquired from each camera in an arrangement configuration illustrated in FIG. 9.

In a case where the object 80 is sufficiently exposed to the external light in the arrangement configuration as illustrated in FIG. 9, the object 80 can be imaged by the imaging device 30A and the imaging device 30B. Here, an example of captured images acquired from the imaging device 30A and the imaging device 30B is illustrated in FIG. 10. A captured image 820 illustrated in FIG. 10 is an image acquired from an angle of view of the imaging device 30A illustrated in FIG. 9, and a captured image 830 is an image acquired from an angle of view of the imaging device 30B.

At the angle of view of the imaging device 30B, since the external light is stronger than luminance of the light emitting elements 801 and 802, bright spots of the light emitting elements 801 and 802 cannot be detected as illustrated in the captured image 830. Also, due to a relationship between the object 80, the imaging device 30B, and an incident direction of the external light which relationship is illustrated in FIG. 9, no shadow of the object 80 is generated in the captured image 830.

On the other hand, at the angle of view of the imaging device 30A, even in a case where the external light is stronger than the luminance of the light emitting elements 801 and 802, a shadow of the object 80 is generated in the captured image 830. Thus, the information processing device 10 can perform position detection according to a combination (positional relationship) of the shadow and a bright spot by using the second position detection algorithm.

Figure 11:
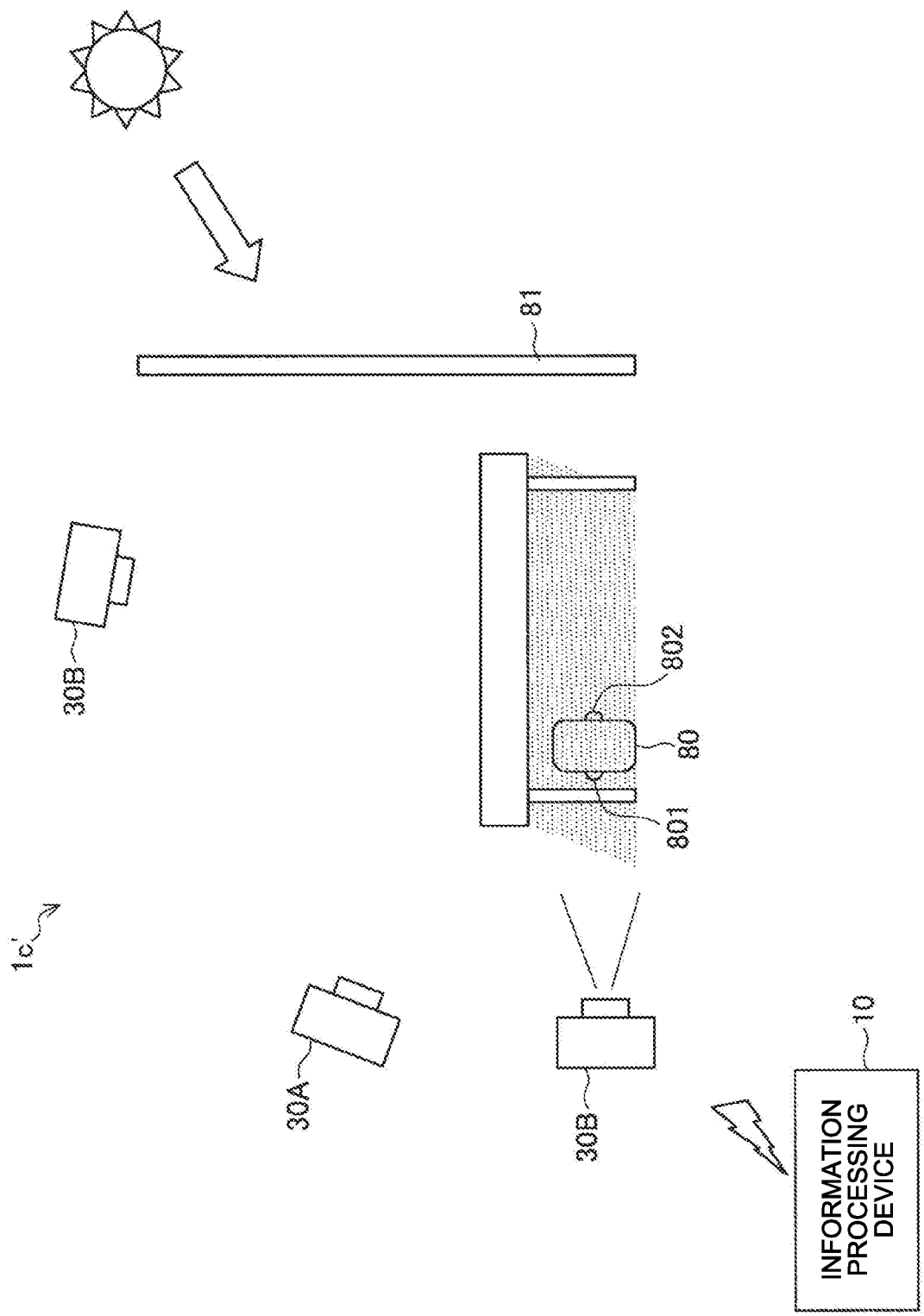
FIG. 11 is a view for describing a case where an arrangement of an object is placed in a shadow of an installation object in an application example to the living environment illustrated in FIG. 9.
Figure 12:
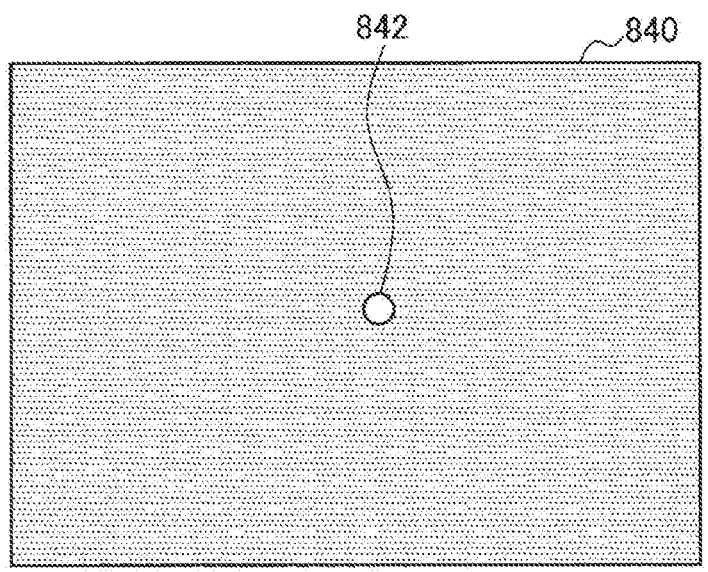
FIG. 12 is a view illustrating an example of a captured image acquired from the imaging device in the case illustrated in FIG. 11.

Also, as illustrated in FIG. 11, when the object 80 is placed in a shadow of an installation object such as a table, a captured image 840 as illustrated in FIG. 12 may be acquired from the imaging device 30C. In this case, the information processing device 10 can perform position detection by detecting only a bright spot by using the first position detection algorithm.

As described above, according to an environment such as an incident direction of external light (specified from a position of a window 81, for example), a position of each imaging device 30, and a position of an installation object in addition to external light illuminance, the information processing device 10 can arbitrarily select position detection algorithm and perform stable position detection.

(4-3. Other)

The information processing system 1 according to the present disclosure has been described in the above.

Note that the information processing system 1 according to the present disclosure is not limited to the above-described example, and the information processing device 10 may perform individual recognition of each object according to a shape of a shadow of the object, for example.

Also, the information processing device 10 may perform individual recognition of each object according to a shape, the number, an arrangement, and the like of bright spots.

Alternatively, visible light may be used as a detection wavelength.

5. CONCLUSION

As described above, in an information processing system according to an embodiment of the present disclosure, it is possible to perform stable position detection even in an environment in which a detection wavelength is included in external light.

Also, by identifying a shape of a shadow, it is possible to identify a plurality of objects individually.

Also, in a case where detection is performed through a plate-like member 50 that transmits an emission wavelength of a light emitting element 42, the light emitting element 42 is provided on a bottom surface of an object 40 placed on the plate-like member 50, and the detection is performed from a back side of a detection area through the plate-like member 50, whereby detection without occlusion becomes possible.

Although a preferred embodiment of the present disclosure has been described in detail in the above with reference to the attached drawings, the present technology is not limited to this example. It is obvious that a person with an ordinary skill in a technological field of the present disclosure can conceive of various modification examples or correction examples within the scope of the technical ideas described in claims, and it should be understood that these also naturally belong to the technical scope of the present disclosure.

For example, a computer program for causing hardware such as a CPU, a ROM, and a RAM built in the information processing device 10 to exert a function of the information processing device 10 can be created. Also, a computer-readable storage medium storing the computer program is also provided.

In addition, the effects described in the present description are merely illustrative or exemplary, and are not limitative. That is, the technology according to the present disclosure can exhibit, along with or instead of the above effects, other effects apparent to those skilled in the art from the description herein.

Note that the present technology can also have the following configurations.

(1)

An information processing device comprising:
a control unit that performs position detection of an object, on which a light emitting unit or a reflective material is provided, on the basis of a captured image acquired by imaging of emitted light or reflected light of the object in a direction facing a side, on which the light emitting unit or the reflective material is provided, of the object, wherein
the control unit adjusts algorithm for the position detection of the object according to an illuminance detection result of external light including at least a wavelength of the emitted light or the reflected light.

(2)
The information processing device according to (1), wherein the control unit switches, as an adjustment of the algorithm, a plurality of kinds of algorithm according to the illuminance detection result.

(3)
The information processing device according to (2), wherein the plurality of kinds of algorithm includes first position detection algorithm based on a position of a bright spot detected from the captured image.

(4)
The information processing device according to (3), wherein the plurality of kinds of algorithm includes second position detection algorithm based on a position of a bright spot with respect to a shadow region detected from the captured image.

(5)
The information processing device according to (4), wherein the second position detection algorithm is algorithm for estimating that the bright spot is a position of the object in a case where the bright spot is placed inside the shadow region.

(6)
The information processing device according to (4) or (5), wherein
the control unit
uses the first position detection algorithm in a case where the illuminance detection result does not exceed a predetermined threshold, and
uses the second position detection algorithm in a case where the illuminance detection result exceeds the predetermined threshold.

(7)
The information processing device according to (4) or (5), wherein
the control unit uses the first position detection algorithm with respect to a region in which the illuminance detection result is lower than a predetermined value, and uses the second position detection algorithm with respect to a region in which the illuminance detection result is higher than the predetermined value in the captured image.

(8)
The information processing device according to any one of (1) to (7), wherein
the information processing device acquires the illuminance detection result of the external light from an external light illuminance sensor.

(9)
The information processing device according to (4) or (5), wherein the illuminance detection result of the external light is acquired from the captured image.

(10)
The information processing device according to (9), wherein
the control unit uses the second position detection algorithm in a case where a region having luminance that exceeds a predetermined threshold in the captured image is equal to or larger than a predetermined size corresponding to the light emitting unit or the reflective material.

(11)
The information processing device according to (9), wherein
the control unit uses the second position detection algorithm in a case where a predetermined shadow region can be detected on the basis of luminance information extracted from the captured image.

(12)
The information processing device according to (1), wherein
the control unit changes, as an adjustment of the algorithm, a parameter used in the algorithm according to the illuminance detection result.

(13)
The information processing device according to any one of (1) to (12), wherein the captured image is an image captured from a side, on which the light emitting unit or the reflective material is provided, of the object through a member that transmits a wavelength of the emitted light or the reflected light.

(14)
An information processing method comprising:
performing position detection of an object, on which a light emitting unit or a reflective material is provided, on the basis of a captured image acquired by imaging of emitted light or reflected light of the object in a direction facing a side, on which the light emitting unit or the reflective material is provided, of the object; and,
adjusting algorithm for the position detection of the object according to an illuminance detection result of external light including at least a wavelength of the emitted light or the reflected light,
performing position detection and adjusting algorithm being performed by a processor.

(15)
A program causing a computer to
function as a control unit that performs position detection of an object, on which a light emitting unit or a reflective material is provided, on the basis of a captured image acquired by imaging of emitted light or reflected light of the object in a direction facing a side, on which the light emitting unit or the reflective material is provided, of the object, wherein
the control unit adjusts algorithm for the position detection of the object according to an illuminance detection result of external light including at least a wavelength of the emitted light or the reflected light.

REFERENCE SIGNS LIST 1, 1a, 1b, 1c INFORMATION PROCESSING SYSTEM
10 INFORMATION PROCESSING DEVICE
100 CONTROL UNIT
101 POSITION DETECTION UNIT
102 POSITION DETECTION ALGORITHM ADJUSTMENT UNIT
110 COMMUNICATION UNIT
120 OPERATION INPUT UNIT
130 DISPLAY UNIT
140 STORAGE UNIT
20 EXTERNAL SENSOR
30 IMAGING DEVICE
30A IMAGING DEVICE
30B IMAGING DEVICE

30C IMAGING DEVICE
40 OBJECT
42 LIGHT EMITTING ELEMENT
50 PLATE-LIKE MEMBER
52 PROJECTOR
60, 61, 62 CAPTURED IMAGE
70 WALL
71 LIGHT EMITTING ELEMENT
80 OBJECT
401, 401A, 401B MALLET
421 LIGHT EMITTING ELEMENT
431 PUCK
501 BOARD SURFACE
601, 602 BRIGHT SPOT
611, 612 SHADOW REGION
622, 625 BRIGHT SPOT
624 SHADOW REGION
801, 802 LIGHT EMITTING ELEMENT
820, 830, 840 CAPTURED IMAGE

The invention claimed is:

1. An information processing device, comprising:
at least one processor configured to:
    determine at least one position detection algorithm from a plurality of position detection algorithms for detection of a position of an object, which includes a light emitting element or a reflective material, based on a comparison of an illuminance of external light with an illuminance of one of emitted light or reflected light of the object,
        wherein the external light includes at least a wavelength of one of the emitted light or the reflected light; and
    detect the position of the object based on execution of the determined at least one position detection algorithm with respect to a captured image acquired by imaging of one of the emitted light or the reflected light by the object,
        wherein the imaging is done in a direction facing a side, on which one of the light emitting element or the reflective material is present, of the object.

2. The information processing device according to claim 1, wherein the at least one processor is further configured to switch between a first position detection algorithm of the plurality of position detection algorithms and a second position detection algorithm of the plurality of position detection algorithms based on an illuminance detection result of the external light.

3. The information processing device according to claim 2, wherein the first position detection algorithm is based on a position of a bright spot detected from the captured image.

4. The information processing device according to claim 3, wherein the second position detection algorithm is based on the position of the bright spot with respect to a shadow region detected from the captured image.

5. The information processing device according to claim 4, wherein the at least one processor is further configured to estimate, based on the second position detection algorithm, that the position of the bright spot is the position of the object in a case where the bright spot is placed inside the shadow region.

6. The information processing device according to claim 4, wherein the at least one processor is further configured to execute:
    the first position detection algorithm in a case where the illuminance detection result is less than a threshold; and
    the second position detection algorithm in a case where the illuminance detection result is greater than or equal to the threshold.

7. The information processing device according to claim 4, wherein the at least one processor is further configured to execute:
    the first position detection algorithm with respect to a first region in the captured image in which the illuminance detection result is lower than a specific value; and
    the second position detection algorithm with respect to a second region in the captured image in which the illuminance detection result is higher than the specific value.

8. The information processing device according to claim 4, wherein the illuminance detection result of the external light is acquired from the captured image.

9. The information processing device according to claim 8, wherein the at least one processor is further configured to execute the second position detection algorithm in a case where the size of a first region in the captured image, whose luminance is greater than a threshold, is one of equal to or larger than a size of a second region which is illuminated by one of the light emitting element or the reflective material.

10. The information processing device according to claim 8, wherein the at least one processor is further configured to execute the second position detection algorithm in a case where the shadow region is detected based on luminance information extracted from the captured image.

11. The information processing device according to claim 1, wherein the at least one processor is further configured to acquire an illuminance detection result of the external light from an external light illuminance sensor.

12. The information processing device according to claim 1, wherein the at least one processor is further configured to change a parameter used in the at least one position detection algorithm based on an illuminance detection result of the external light.

13. The information processing device according to claim 1, wherein the captured image is captured from the side of the object through a member that transmits the wavelength of the emitted light or the reflected light.

14. An information processing method, comprising:
    determining at least one position detection algorithm from a plurality of position detection algorithms for detection of a position of an object, which includes a light emitting element or a reflective material, based on a comparison of an illuminance of external light with an illuminance of one of emitted light or reflected light of the object,
        wherein the external light includes at least a wavelength of one of the emitted light or the reflected light; and
    detecting the position of the object based on execution of the determined at least one position detection algorithm with respect to a captured image acquired by imaging of one of the emitted light or the reflected light by the object,
        wherein the imaging is done in a direction facing a side, on which one of the light emitting element or the reflective material is present, of the object.

15. A non-transitory computer-readable medium having stored thereon computer implemented instructions that, when executed by an information processing device, causes the information processing device to execute operations, the operations:
    determining at least one position detection algorithm from a plurality of position detection algorithms for detection of a position of an object, which includes a light emitting element or a reflective material, based on a comparison of an illuminance of external light with an illuminance of one of emitted light or reflected light of the object, wherein the external light includes at least a wavelength of one of the emitted light or the reflected light; and detecting the position of the object based on execution of the determined at least one position detection algorithm with respect to a captured image acquired by imaging of one of the emitted light or the reflected light by the object, wherein the imaging is done in a direction facing a side, on which one of the light emitting element or the reflective material is present, of the object.

16. An information processing device, comprising:

at least one processor configured to:

select at least one position detection algorithm from a plurality of position detection algorithms for detection of a position of an object, which includes one of a light emitting element or a reflective material, based on an illuminance detection result of external light which includes at least a wavelength of one of emitted light or reflected light of the object; and detect the position of the object based on execution of the selected at least one position detection algorithm with respect to a captured image acquired by imaging of one of the emitted light or the reflected light of the object in a direction facing a side, on which the light emitting unit or the reflective material is present, of the object, wherein the at least one position detection algorithm includes:

a first position detection algorithm which is based on a position of a bright spot detected from the captured image; and a second position detection algorithm which is based on the position of the bright spot with respect to a shadow region detected from the captured image, and the second position detection algorithm is to estimate that the position of the bright spot is the position of the object in a case where the bright spot is placed inside the shadow region.

* * * * *